US011194790B1

(12) United States Patent
Farber et al.

(10) Patent No.: US 11,194,790 B1
(45) Date of Patent: Dec. 7, 2021

(54) CLIENT WRITE EVENT SEQUENCING SYSTEM IN A FEDERATED DATABASE PLATFORM

(71) Applicants: Atlassian PTY Ltd., Sydney (AU); Atlassian, Inc., San Francisco, CA (US)

(72) Inventors: Jeffrey Lawrence Farber, San Mateo, CA (US); Sidney Gee-Lake Shek, Sunnyvale, CA (US); Max Robert Morton, Palo Alto, CA (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 23 days.

(21) Appl. No.: 16/880,300

(22) Filed: May 21, 2020

(51) Int. Cl.
*G06F 16/00* (2019.01)
*G06F 16/23* (2019.01)
*G06F 16/21* (2019.01)

(52) U.S. Cl.
CPC ........ *G06F 16/2379* (2019.01); *G06F 16/214* (2019.01)

(58) Field of Classification Search
CPC ................ G06F 16/214; G06F 16/2379
See application file for complete search history.

(56) References Cited

U.S. PATENT DOCUMENTS

| | | | | |
|---|---|---|---|---|
| 9,495,252 | B2 * | 11/2016 | Zhu ..................... | G06F 3/067 |
| 9,495,421 | B1 * | 11/2016 | DeHaan ............... | G06F 16/258 |
| 10,354,093 | B1 | 7/2019 | Farber et al. | |
| 2015/0324178 | A1 * | 11/2015 | Arnold ................ | G06F 8/71 |
| | | | | 717/121 |
| 2016/0142481 | A1 * | 5/2016 | Castaneda ........... | G06F 16/27 |
| | | | | 709/217 |
| 2020/0257732 | A1 * | 8/2020 | Oh ..................... | G06F 16/90348 |

FOREIGN PATENT DOCUMENTS

CN            107229555 A    * 10/2017

* cited by examiner

*Primary Examiner* — Diedra McQuitery
(74) *Attorney, Agent, or Firm* — Alston & Bird LLP

(57) ABSTRACT

Various embodiments are directed to a federated network and database platform that is configured to sequence client write events occurring among several autonomous software applications. The federated network and database platform includes a client event sequencing server that is configured to receive a migration corpus of client write events from at least one software application server and assign a back-date time stamp to each client write event of the migration corpus. Upon receiving a new client write event associated with the software application, the client event sequencing server is configured to assign a current time stamp to the new client write event and store the new client write event to a client event sequencing database in a manner that positions the new client write event relative to the back-dated migration corpus of client write events.

29 Claims, 6 Drawing Sheets

CLIENT WRITE EVENT SEQUENCING SYSTEM IN A FEDERATED DATABASE PLATFORM

BACKGROUND

Federated computer networks are often supported by widely distributed servers and corresponding hardware resources. Such resources are configured to manage and support several distinct and autonomous software applications. Applicant has identified a number of deficiencies and problems associated with tracking and sequencing client events occurring within and among such federated computer networks. Through applied effort, ingenuity, and innovation, one or more of these deficiencies and problems have been solved by developing solutions that are included in embodiments of the present disclosure, various examples of which are described in detail herein.

BRIEF SUMMARY

In general, embodiments of the present invention provide methods, apparatus, and computer-program products for sequencing client write events that are received in parallel from a client device to a client event sequencing server and at least one software application server that is configured to support a software application.

In accordance with one embodiment, a method is provided. The method comprises receiving a migration corpus of client write events to the client event sequencing server from the at least one software application server. The method further comprises assigning, by the client event sequencing server, a back-date time stamp to each client write event of the migration corpus. A new client write event associated with the software application is received to the client event sequencing server. In one embodiment, the method further comprises assigning, by the client event sequencing server, a current time stamp to the new client write event and storing the new client write event to a client event sequencing database in relation to the migration corpus of client write events based at least in part on comparing the current time stamp assigned to the new client write event and the back-date time stamp assigned to each client write event of the migration corpus.

In some embodiments, the client write events are received from a client device simultaneously to the client event sequencing server and the at least one software application server. In other embodiments, the client write events are received from the client device to the at least one software application server, and the at least one software application server subsequently, but substantially simultaneously, provides copies of the client write events to the client event sequencing server.

In one embodiment, the back-date time stamp designates one year prior to a copy operation start time determined by the client event sequencing server. In another embodiment, the back-date time stamp designates six months prior to a copy operation start time determined by the client event sequencing server. In still other embodiments, the back-date time stamp is selected at a time ($\beta$) prior to a copy operation start time ($t_o$) minus any estimated network latency or device clock skew period ($\alpha$). In some embodiments, $\alpha$ ranges between 5 milliseconds and one year.

In some embodiments, the migration corpus embodies a collection of client write events that have been stored to a software application server while the client event sequencing server was down or offline. In other embodiments, the migration corpus embodies a collection of client write events that have been stored to a software application server prior to activation of the client event sequencing server.

In one embodiment, the client write event is associated with an authorization event while, in other embodiments, the client write event is associated with a revocation event.

In some embodiments, an example method further comprises receiving a second migration corpus of client write events to the client event sequencing server from the at least one software application server. In some embodiments, the example method further comprises assigning, by the client event sequencing server, a second back-date time stamp to each client write event of the second migration corpus. In still another embodiment, the example method further comprises storing the new client write event to the client event sequencing database in relation to the migration corpus of client write events and the second migration corpus of client write events received from the at least one software application server based at least in part on comparing the current time stamp assigned to the new client write event, the back-date time stamp assigned to each client write event of the migration corpus, and the second back-date time stamp assigned to each client write event of the second migration corpus.

In some embodiments, the back-date time stamp is selected at a time ($\beta$) prior to a copy operation start time ($t_o$) minus any estimated network latency or device clock skew period ($\alpha$) and wherein the second back-date time stamp is selected at a time ($\beta'$) that is after the back-date time stamp ($\beta$) but prior to the copy operation start time ($t_o$) minus the estimated network latency or device clock skew period ($\alpha$).

The appended claims serve as a further summary of the present disclosure. This summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
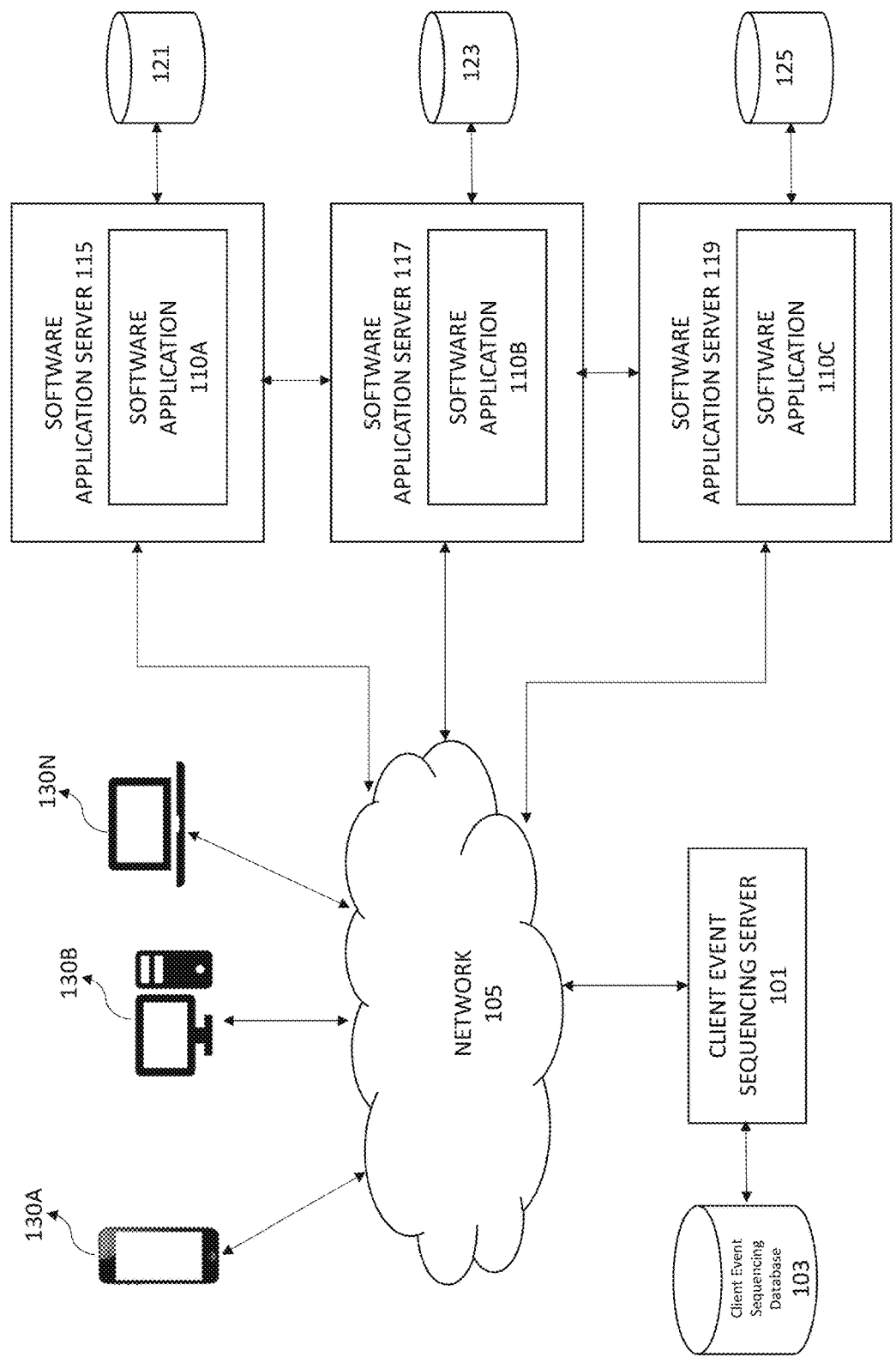
Figure 2:
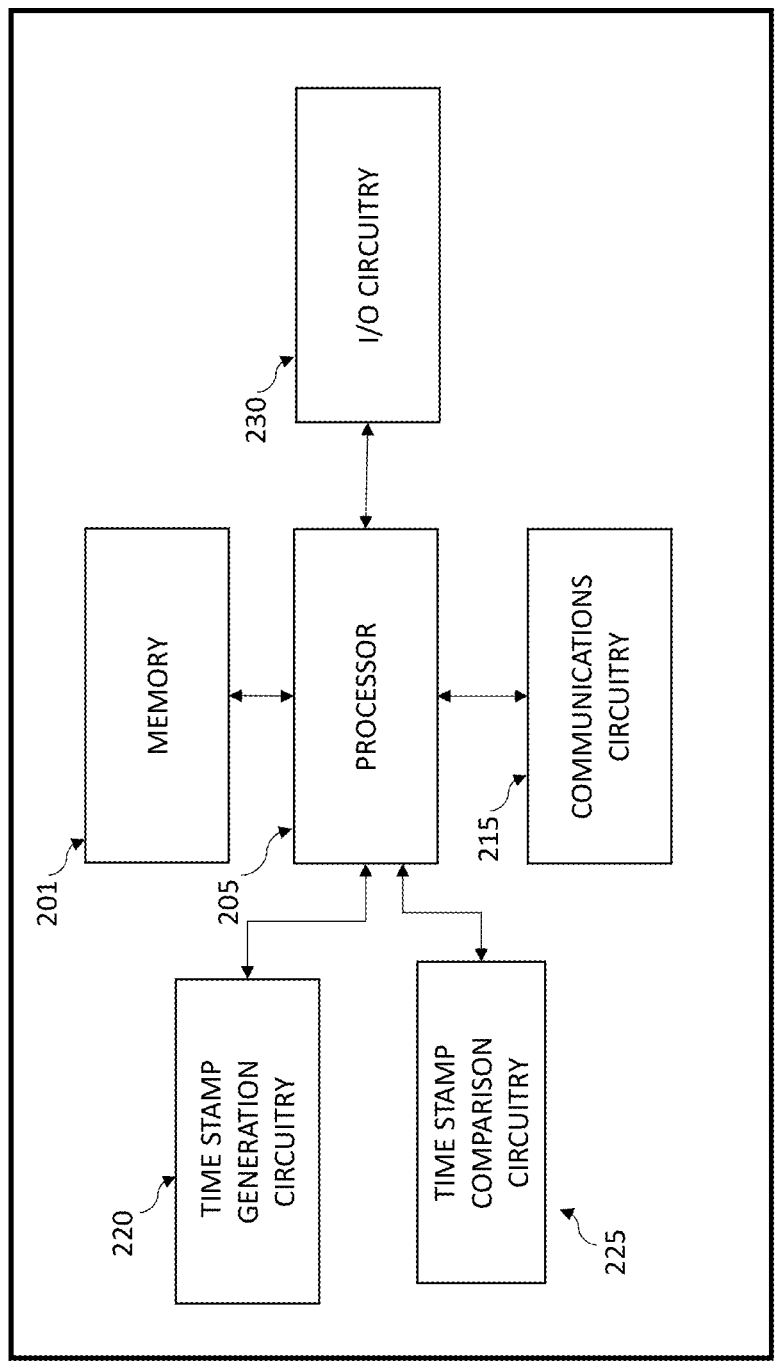
Figure 3:
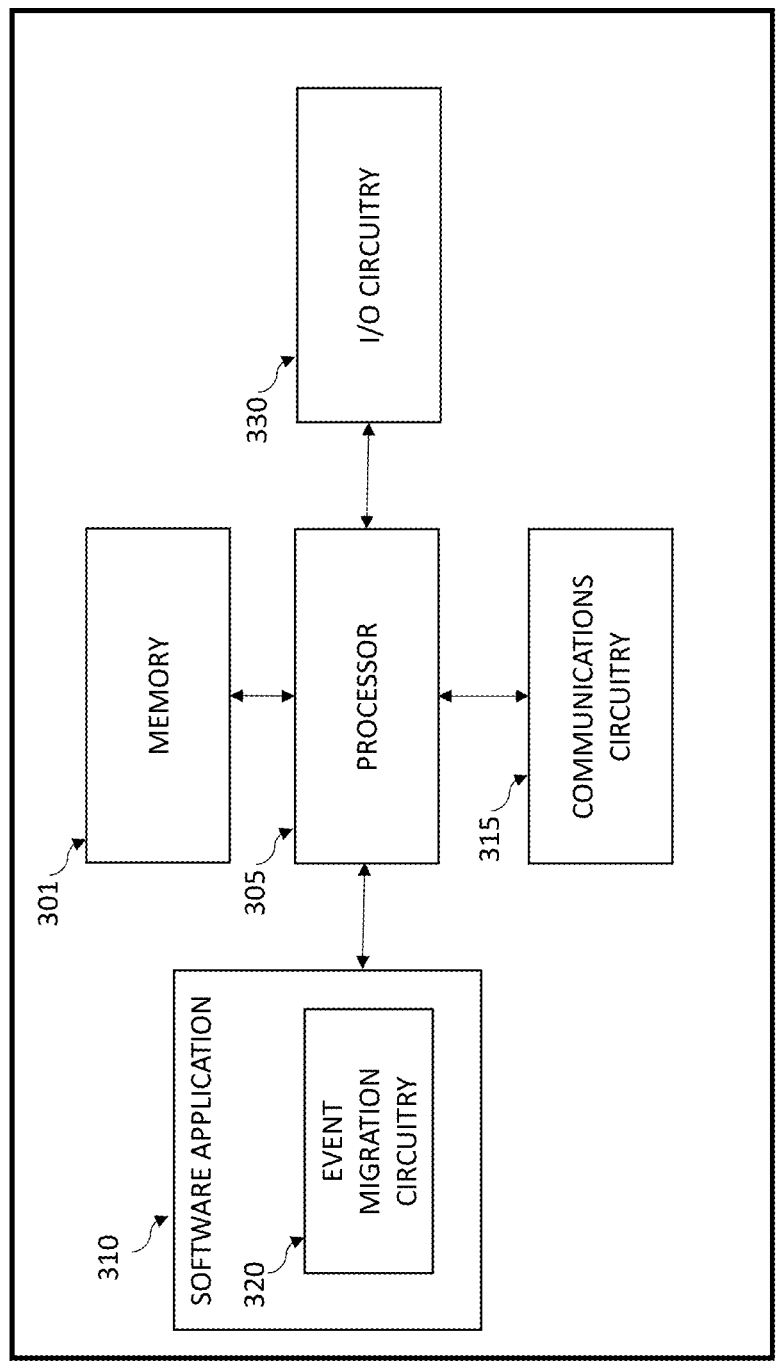
Figure 4:
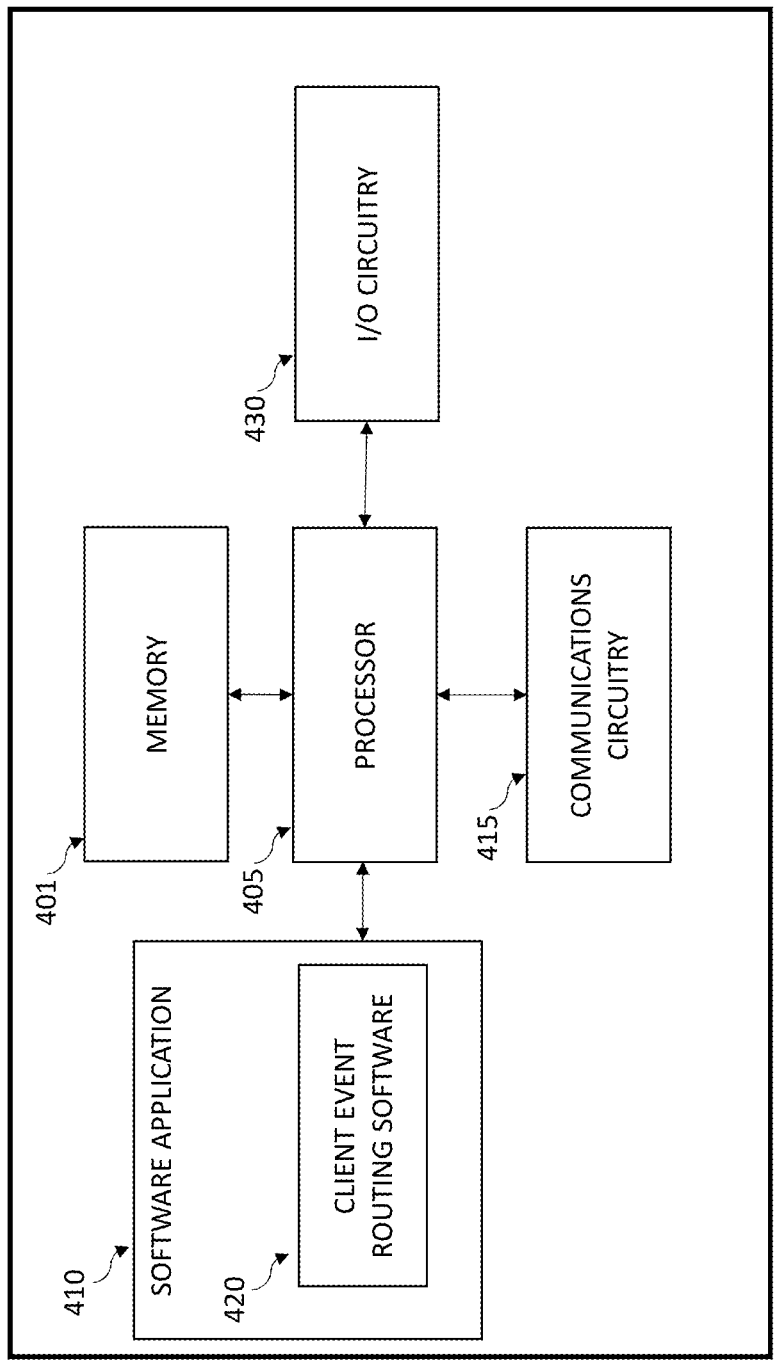
Figure 5A:
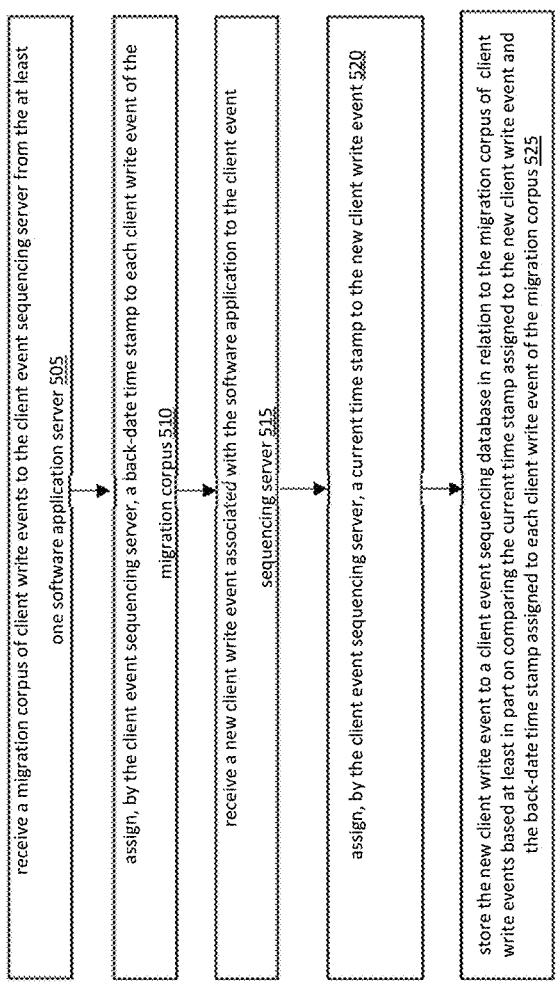
Figure 5B:
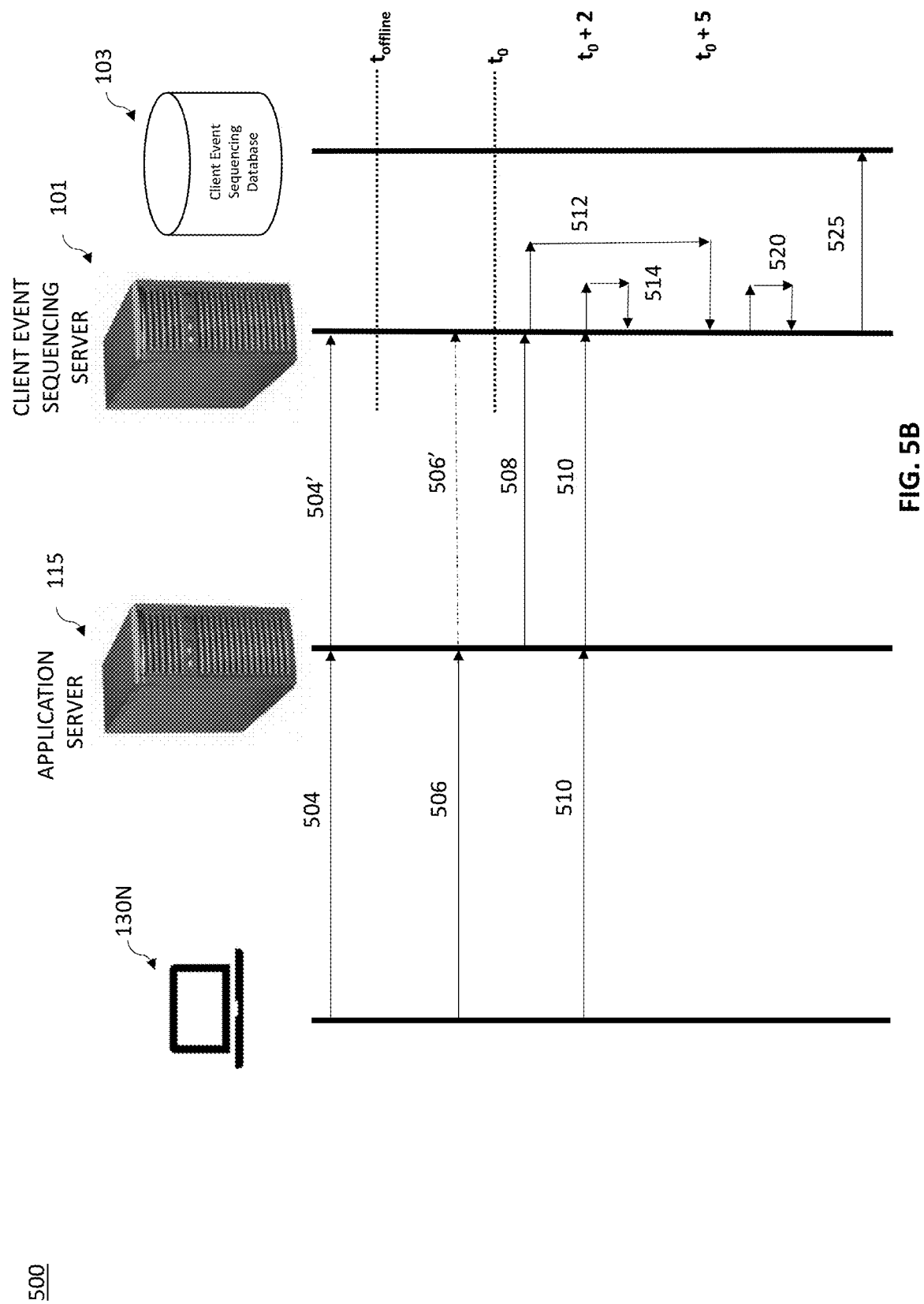

Having thus described some embodiments in general terms, references will now be made to the accompanying drawings, which are not necessarily drawn to scale, and wherein:

FIG. 1 is a system architecture diagram of a federated database and platform configured to practice embodiments of the present disclosure;

FIG. 2 is an exemplary schematic diagram of a client event sequencing server structured according to embodiments of the present disclosure;

FIG. 3 is an exemplary schematic diagram of a software application server structured according to embodiments of the present disclosure;

FIG. 4 is an exemplary schematic diagram of a client device structured according to embodiments of the present disclosure;

FIG. 5A is a flowchart illustrating example operations for assigning back-date time stamps to client write events of a migration corpus to support storing of other client write events in relation to the migration corpus in accordance with one embodiment of the present disclosure; and FIG. 5B is an example signal diagram illustrating data flow operations for assigning back-date time stamps to client write events of a migration corpus to support storing of other client write events in relation to the migration corpus in accordance with one embodiment of the present disclosure.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments of the invention generally relate to a federated network and database platform that supports multiple different software applications. Each of the software applications accommodates a plurality of user-based and application-based events that must be precisely tracked and managed. It is particularly difficult to ensure precise sequencing of such events as the federated database platform expands in scale.

Example application-based events that must be precisely tracked and sequenced for each of the different software applications are authorization (e.g., access grant) events and revocation events. Access is granted and revoked for individual users of each software application through issuance of such authorization and revocation events.

The inventors have determined that in large distributed networks that support multiple different software applications it may be desirable to track and sequence authorization and revocation events for each software application using a client event sequencing server. As will be described in greater detail below, a client event sequencing server configured in accordance with various embodiments discussed herein is configured to receive client write events (e.g., authorization and revocation events) in parallel to the software application servers that support each of the various software applications. In this regard, the client event sequencing server can be relied upon as a resource for precise client write event tracking for not just one software application but for all of the software applications that are supported by the federated network and database platform.

To operate effectively, a client event sequencing server must have access to client write event data that sequentially correspondences to client write event data captured by the various software application servers. This is ensured on the one hand by configuring client devices that run each software application to transmit client write events to the client event sequencing server and the respective software application server in parallel or substantially in parallel. In various embodiments, transmitting client write events in parallel comprises simultaneous transmission by a client device of a client write event to both a respective software application server and a client event sequencing server. In other embodiments, transmitting client events in parallel comprises transmission by a client device of a client write event to a respective software application server, which in turn then immediately transmits the received client write event to the client event sequencing server. However, this parallel or substantially parallel transmission approach only ensures matching client write event data at the client event sequencing server and a respective software application server at current and future times. It does not ensure proper sequencing of client write event data for past time periods or in circumstances where one or the other of the client event sequencing server or the software application server are offline.

For illustration purposes, let us consider a user, Jeremy, who is granted access to a software application (e.g., Jira® by Atlassian Pty. Ltd.) by an admin user, Stan. Stan's client device issues an authorization event for Jeremy that is sent to the client event sequencing server and the Jira® software application server in parallel. Jeremy is granted access to Jira® and everything works well because the client event sequencing server matches the Jira® software application server.

However, let us consider a circumstance where the client event sequencing server is taken offline due to a system error or routine maintenance. During this offline period, Stan issued a revocation event to revoke Jeremy's Jira® access. The Jira® software application server received and logged the revocation event, but the client event sequencing server did not because it was offline. In ordinary circumstances, the client event sequencing server is configured to begin copying from the Jira® software application server any client write event data that it missed during the offline period immediately once it comes online, let's say at time $t_0$. This copy operation is completed shortly thereafter, at time $t_0+5$ seconds.

Stan's revocation of Jeremy's Jira® access might have been inadvertent. Therefore, it is possible that Stan might issue an authorization event for Jeremy before completion of the copy operation at time $t_0+2$ seconds. Should this occur, in ordinary circumstances, the client event sequencing server is configured to log and sequence Jeremy's client events as follows: authorization event at a time prior to $t_0$, authorization event at time $t_0+2$ seconds, and revocation event at a time $t_0+5$ seconds (i.e., at completion of the copy operation). From the perspective of the client event sequencing server, Stan's revocation of Jeremy's Jira® access occurred after—not prior to—Stan's second authorization of Jeremy. This stands to reason because the client event sequencing server only became aware of Stan's revocation of Jeremy's Jira® access after it completed the copy operation of the client write event data that it missed. There is nonetheless a problem in that the client event sequencing server would indicate that Jeremy's Jira® access stands revoked while the Jira® software application server would indicate that Jeremy's Jira® access stands as granted.

This problem is addressed by configuring the client event sequencing server to copy or migrate past client write event data from a software application server using the methods and protocols discussed herein. For example, in one embodiment, the client event sequencing server is configured to receive a migration corpus of client write events from a software application server. The client event sequencing server is configured to assign a back-date time stamp to each client write event of the migration corpus. In some embodiments, this back-date time stamp is set for one year prior to a current time. In other embodiments, this back-date time stamp is set for a past time instance that is expected to exceed any expected network latency or clock skew. This way any client write event of the copied migration corpus is certain to be sequenced as occurring prior to any newly received client write event.

Distributed database platforms structured in accordance with various embodiments are thus configured to properly sequence client events. Such functionality is particularly important as networks expand in scale, complexity, and involve multiple software applications each requiring programmatic client event generating services such as credential management services.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "or" is used herein in both the alternative and conjunctive sense, unless otherwise indicated. The terms "illustrative," "example," and "exemplary" are used to be examples with no indication of quality level.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The term "circuitry" should be understood broadly to include hardware and, in some embodiments, software for configuring the hardware. For example, in some embodiments, "circuitry" may include processing circuitry, storage media, network interfaces, input/output devices, and the like.

The term "user" should be understood to refer to an individual, group of individuals, business, organization, and the like. The users referred to herein may access a federated network and database platform using client devices (as defined herein).

The term "client device" refers to computer hardware and/or software that is configured to access at least one software application that is made available by a software application server of the federated network and database platform. The software application server is on another computer system, in which case the client device accesses the software application by way of a network. Client devices may include, without limitation, smart phones, tablet computers, laptop computers, wearables, personal computers, enterprise computers, and the like.

The term "client event" refers to a client computing device originating task, operation, job, action, or process that must be identified, tracked, properly sequenced, and stored by a federated network and database platform to promote proper functioning of one or more software applications supported by the federated network and database platform. Client events generally require database storage or write commands. One example client event is an "authorization event" in which an admin user operating an admin client device validates and authorizes a user for accessing a software application supported by the federated network and database platform (such as Jira® by Atlassian Pty. Ltd.). Such validation and authorization may culminate in the issuance of user access credentials as will be apparent to one of ordinary skill in the art in view of this disclosure.

Another example client event is a "revocation event" in which an admin user operating an admin client device removes a prior validation and authorization for a user to access a software application supported by the federated network and database platform. Such removal may culminate in the revocation of user access credentials as will be apparent to one or ordinary skill in the art in view of this disclosure.

The term "client write event" refers to a task or command and associated instructions for storing a record of a particular client event to a database. In various embodiments, client write events are generated by a software application running on a client device and transmitted to a software application server. In one embodiment, client write events are transmitted by the software application running on the client device to the software application server and to a client event sequencing server substantially simultaneously. In other embodiments, the client write events are transmitted by the client device only to the software application server, which in turn substantially immediately transmits the received client write events to the client event sequencing server. Because client write events are received substantially simultaneously to both the software application server and the client event sequencing server various embodiments discussed herein refer to such clients write events as being received to these two distinct servers "in parallel."

The term "migration corpus" refers to a collection of client write events that are transmitted or copied from a software application server (e.g., a software application database accessible by the software application server) to a client event sequencing server. In some examples, a migration corpus embodies a collection of client write events that have been stored to a software application server while a client event sequencing server was down or offline. In other embodiments, a migration corpus embodies a collection of client write events that have been stored to a software application server prior to activation of the client event sequencing server.

The term "client event sequencing server" refers to computer hardware and/or software that is configured to send, receive, store, and sequence client write events for one or more software applications in a federated network and database platform. For example, in one embodiment, a client event sequencing server is configured to receive and store client write events that are transmitted by a client device running a software application. In another embodiment, a client event sequencing server is configured to receive and store the client write events of a migration corpus that is sent by or retrieved from a software application server. In one embodiment, a client event sequencing server is configured to assign current time stamps to the received client write events. In embodiments involving a received migration corpus, a client event sequencing server is configured to assign a back-date time stamp for each client write event of the migration corpus.

The term "client event sequencing database" refers to a computing location, such as a memory device, where data is stored, accessed, modified and otherwise maintained by the client event sequencing server of the federated network and database platform. The stored data includes information that facilitates operation of the federated network and database platform including a log or registry of client write events. For example, stored data may include time stamp data associated with client write events to facilitate a temporal ordering of the client write events. The client event sequencing database may be embodied as a data storage device or devices, as a separate database server or servers, or as a combination of data storage devices and separate database servers. The client event database may be a dedicated device and/or a part of a larger repository.

The term "back-date time stamp" refers to a sequence of characters and/or other encoded information that serves as a record for the occurrence of a client write event but which is back-dated relative to the current system time or clock time of the device issuing the back-date time stamp (e.g., the client event sequencing server). For example, in various embodiments discussed herein, if a client event sequencing server initiates a copy operation of a migration corpus at time to, the client event sequencing server is configured to issue back-date time stamps ($\beta$) for each client write event of the migration corpus to ensure that the newly back-dated client write events have time stamps prior to $t_0$ minus some value $\alpha$, which represents any likely or estimated network device clock skew or network transmission latency. This may be expressed as $\beta < t_0 - \alpha$.

In relatively small networks with low expected latency or device clock skew, this might translate to back-date time stamps of $t_0$ minus 5 milliseconds. In larger networks that are expected to have larger network latencies or device clock skews, this might translate to back-date time stamps of $t_0$ minus 5 seconds. In other embodiments, a client event sequencing server might be configured to issue a back-date time stamp to client write events of a migration corpus on an exaggerated basis because network latencies or clock skews might not be well known. For example, a client event sequencing server might be configured to issue a back-date time stamp to client write events of a migration corpus of $t_0$ minus one year. In other embodiments, a client event sequencing server may be configured to issue a back-date time stamp to client write events of a migration corpus of to minus six months. In still other embodiments, a client event sequencing server may be configured to issue a back-date time stamp to client write events of a migration corpus of to minus $Y\alpha$, where $\alpha$ represents any likely or estimated network device clock skew or network transmission latency and Y is a back-date multiplier. This may be expressed as $\beta < t_0 - Y\alpha$. In some embodiments, Y is a value between 1.5 and 100. In other embodiments, Y is between 1.25 and 25.

In some embodiments, two or more iterative copy operations may be needed causing two or more corresponding iterative back-dating operations. For example, a client event sequencing server may be configured to initiate a first copy operation of a migration corpus at time to and may further be configured to issue back-date time stamps ($\beta$) for each client write event of the migration corpus of $t_0$ minus 5 seconds. Given that this example network has an estimated network latency and/or device clock skew of 5 milliseconds, this back-date time stamp selection desirably satisfies the expression ($\beta$) $< t_0 - \alpha$ as $t_0$ minus 5 seconds is less than to minus 5 milliseconds.

The client event sequencing server may need to perform a second copy operation of the migration corpus due to system error or other reason. In such circumstances, the client event sequencing server is configured to issue second back-date time stamps for each client write event of the migration corpus at a time ($\beta'$) between the first back date time stamp $\beta$ and the network latency and/or device clock skew period ($t_0$ minus 5 milliseconds). In other words, in various embodiments, the second back-date time stamps are selected to satisfy the following expression: $\beta < \beta' < t_0 - \alpha$. In the above example, that equates to selecting a second back-date time stamp $\beta'$ that is between the first back-date time stamp ($t_0$ minus 5 seconds) and the network latency and/or clock device skew period ($t_0$ – 5 milliseconds) or, for example, $t_0$ minus 3 seconds.

Example System Architecture for Implementing Embodiments of the Present Invention FIG. 1 is a system architecture diagram of a federated database and platform configured to practice embodiments of the present disclosure. In the depicted embodiment, the federated database and platform 100 includes a client event sequencing server 101. The client event sequencing server 101 comprises or otherwise communicates with a client event sequencing database 103. The client event sequencing database 103 may be configured to have a persistent data portion for storing persistent data therein, and a cache portion for storing non-persistent data therein. In embodiments, the client event sequencing database 103 is configured to at least store client write events and associated time stamp data.

In some preferred embodiments, the client write events stored in the client event sequencing database 103 comprise data and instructions relating to the provisioning of user permissions (i.e., authorization events and revocation events) and associated time stamp data for various software applications supported by the federated database and platform 100. The depicted client event sequencing database 103 is configured to store authorization events, revocation events, and associated time stamp data pertaining to software applications 110A-110C. The client event sequencing server 101 is configured to store all received client write events to its client event sequencing database 103.

Software applications 110A-110C are respectively supported by software application servers 115, 117, and 119. The software application servers 115, 117, 119 comprise or otherwise communicate with application databases 121, 123, 125, respectively. The application databases 121, 123, 125 are each configured to have or communicate with respective persistent data portions for storing persistent data therein, and cache portions for storing non-persistent data therein. The software application servers 115, 117, 119 are each configured to store any received client write events to a respective application database.

Each of the depicted software applications 110A-110C is a separate and autonomous application that is configured to run on a separate compiled code base. For illustration purposes, the depicted software applications 110A-110C may be, respectively, the Jira® application, the Confluence® application, and the Trello® application, each by Atlassian Pty. Ltd. Methods and systems for managing content including permissions by an authorization server among a plurality of autonomous software applications are disclosed in commonly owned U.S. Pat. No. 10,354,093 entitled *Managing Content Authorization in a Federated Application System*, which is hereby incorporated by reference in its entirety.

In various embodiments, the client event sequencing server 101 is configured to receive client write events issued by client devices 130A, 130B, 130N through network 105 in parallel with at least one of software application server 115, software application server 117, and/or software application server 119. In such embodiments, the client event sequencing server 101 facilitates centralized database management of client write events for software applications within the federated database and platform 100. For example, software application server 115 (hereinafter depicting the Jira® software application server) of the federated database and platform 100 may require upgrading or consolidating of its server or storage hardware, the addition of a database, validation of data or the like. Client event sequencing server 101 is configured to facilitate such functionality.

In some circumstances, it may nonetheless be necessary that client event sequencing server 101 retain a complete and separate copy of the client event data stored in application database 121—in the case of a live update for instance. In this embodiment, the client event sequencing server 101 receives a migration corpus of client write events from the Jira® software application server (i.e., software application server 115). The client event sequencing server 101 assigns a back-date time stamp to each client write event of the migration corpus. These back-date time stamps back-date the time at which the migration corpus was received by the client event sequencing server 101.

The client event sequencing server 101 subsequently receives new client write events associated with the Jira® software application server (software application server 115). The client event sequencing server 101 assigns current time stamps to the new client write events, and stores the new client write events in the client event sequencing database 103. The client event sequencing server 101 sequences the new client write events by comparing the current time stamps to the back-date time stamps. In this regard, the back-date time stamps prevent the erroneous result of newly received client write events occurring during the live update appearing to the client event sequencing server 101 as older than recently copied but older client write events.

The client event sequencing server 101 receives client write events that originate from client devices 130A, 130B, 130N in parallel with each of the software application servers 115, 117, 119. The client devices 130A, 130B, 130N may be any computing device as defined above. Electronic data received by the client event sequencing server 101 and software application servers 115, 117, 119 from the client devices 130A, 130B, 130N may be provided in various forms and via various methods. For example, the client devices 130A, 130B, 130N may include desktop computers, laptop computers, smartphones, netbooks, tablet computers, wearables, and the like.

In embodiments where a client device 130A, 130B, 130N is a mobile device, such as a smart phone or tablet, the client device 130A, 130B, 130N may execute an "app" to interact with the client event sequencing server 101 and software application servers 115, 117, 119. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client devices 130A, 130B, 130N may interact with the client event sequencing server 101 and software application servers 115, 117, 119 via a web browser. As yet another example, the client device 130A, 130B, 130N may include various hardware or firmware designed to interface with the client event sequencing server 101 and software application servers 115, 117, 119.

Client write events are received from the client devices 130A, 130B, 130N over network 105. Network 105 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 105 may include a cellular telephone, an 802.11, 802.16, 802.20, and/or WiMax network. Further, network 105 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the federated database and platform. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

In the depicted embodiment, the software application servers 115, 117, 119 are communicatively coupled directly to network 105. Furthermore, the software application servers 115, 117, 119 are at least indirectly linked to one another. For instance, software application server 115 is indirectly linked to software application server 119 via software application server 117.

In some embodiments, client devices 130A, 130B, 130N are configured to execute an app (such as software application 410 shown in FIG. 4) that is configured to transmit client write events to respective APIs of the client event sequencing server 101 and at least one of software application servers 115, 117, 119. In such embodiments, each software application of the software application servers 115, 117, 119 has its own native client-side app.

In other embodiments, an app executed by the client device 130A, 130B, 130N may be configured only to transmit client write events to an API of its native software application server 115, 117, or 119. That native software application server 115, 117, or 119 is configured to then immediately transmit any received client write events (or copies thereof) to the client event sequencing server 101.

Example Apparatus for Implementing Embodiments of the Present Disclosure

Example Client Event Sequencing Server

FIG. 2 is an exemplary schematic diagram of a client event sequencing server structured according to embodiments of the present disclosure. The client event sequencing server 101 may be embodied by one or more computing systems, such as client event sequencing server 200 shown in FIG. 2. The client event sequencing server 200 may include a memory 201, a processor 205, input/output ("I/O") circuitry 230, communications circuitry 215, time stamp generation circuitry 220, and time stamp comparison circuitry 225.

In some embodiments, the processor 205 (and/or coprocessor or any other processing circuitry assisting or otherwise associated with the processor) may be in communication with the memory 201 via a bus for passing information among components of the client event sequencing server 200. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the client event sequencing server 200 to carry out various functions in accordance with example embodiments of the present disclosure.

The processor 205 may be embodied in a number of different ways and may, for example, include one or more processing devices configured to perform independently. Additionally, or alternatively, the processor 205 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 205 may be configured to execute instructions stored in the memory 201 or otherwise accessible to the processor 205. Alternatively, or additionally, the processor 205 may be configured to execute hard-coded functionality. As such, whether configured by hardware or software methods, or by a combination thereof, the processor 205 may represent an entity (e.g., physically embodied in circuitry) capable of performing operations according to an embodiment of the present disclosure while configured accordingly. Alternatively, as another example, when the processor 205 is embodied as an executor of software instructions, the instructions may specifically configure the processor 202 to perform the algorithms and/or operations described herein when the instructions are executed.

As just one example, the processor 205 may be configured to receive a plurality of client write events received from client devices 130A, 130B, 130N (shown in FIG. 1) to enable sequencing thereof. The processor 205 ensures that user permissions associated with software applications in the federated database and platform are properly stored and logged to facilitate a shared permissions system of the federated database and platform.

The depicted client event sequencing server 200 includes input/output circuitry 230 that may, in turn, be in communication with processor 205 to provide output to the user and, in some embodiments, to receive an indication of a user input. The input/output circuitry 230 may comprise a user interface and may include a display and may comprise a web user interface, a mobile application, a client device, or the like. In some embodiments, the input/output circuitry 230 may also include a keyboard, a mouse, a joystick, a touch screen, touch areas, soft keys, a microphone, a speaker, or other input/output mechanisms. The processor 205 and/or user interface circuitry comprising the processor 205 may be configured to control one or more functions of one or more user interface elements through computer program instructions (e.g., software and/or firmware) stored on a memory accessible to the processor (e.g., memory 201, and/or the like).

The communications circuitry 215 may be any means such as a device or circuitry embodied in either hardware or a combination of hardware and software that is configured to receive and/or transmit data from/to a network and/or any other device, circuitry, or module in communication with the client event sequencing server 200. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The time stamp generation circuitry 220 may be any means such as a device or circuitry combined in either hardware or a combination of hardware and software that is configured to receive client write events, detect a device clock or system time, and generate time stamps based on the detected device clock or system time for each of the received client write events. The depicted time stamp generation circuitry 220 is thus configured to communicate with network 105 (shown in FIG. 1), software application servers 115, 117, 119 (shown in FIG. 1), and client devices 130A, 130B, 130N (shown in FIG. 1) to perform time stamp generation tasks. In some embodiments, the time stamp generation circuitry 220 receives client write events from one or more of client devices 130A, 130B, 130N (shown in FIG. 1). In these embodiments, the time stamp generation circuitry 220 is configured to generate current time stamps based on the detected device clock or system time of the client event sequencing server 101. In other embodiments, the time stamp generation circuitry 220 receives a migration corpus of client write events from one or more of software application servers 115, 117, 119 (shown in FIG. 1). In embodiments involving a received migration corpus, the time stamp generation circuitry 220 is configured to generate back-date time stamps based on the detected clock or system time at the time the copy or migration operation was initiated ($t_0$) and on the estimated network latency and/or device clock skew ($\alpha$) as discussed herein.

The time stamp comparison circuitry 225 may be any means such as a device or circuitry combined in either hardware or a combination of hardware and software that is configured to compare time stamps generated and assigned by time stamp generation circuitry 220. In some embodiments, the time stamp comparison circuitry 225 compares current time stamps assigned to new client write events to back-date time stamps assigned to the client write events of a migration corpus. The client event sequencing server 101 (shown in FIG. 1) stores the new client write events to the client event sequencing database 103 (shown in FIG. 1) in relation to the migration corpus of write events based at least in part on comparing the current time stamps and the back-date time stamps. In some embodiments, client event sequencing server 101 may not include or employ time stamp comparison circuitry 225 as shown and simply store client write events to the client event sequencing database 103 leaving other systems, programs, or modules to work out sequencing based on time stamps issued by the time stamp generation circuitry 220.

Example Software Application Server

FIG. 3 is an exemplary schematic diagram of a software application server structured according to embodiments of the present disclosure. In the foregoing disclosure, the Jira® software application server has been depicted as software application server 115. However, any of software application servers 115, 117, 119 may be embodied by one or more computing systems, such as software application server 300 shown in FIG. 3. The software application server 300 may include a memory 301, a processor 305, communications circuitry 315, input/output ("I/O") circuitry 330, and one or more native software applications 310 comprising event migration circuitry 320. The software application server 300 may be configured, using one or more of the circuitries 330, 315, or 320, to execute the operations described herein.

Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the software application server 300 may provide or supplement the functionality of particular circuitry. For example, the processor 305 may provide processing functionality, the memory 301 may provide storage functionality, the communications circuitry 315 may provide network interface functionality, and the like.

In some embodiments, the processor 305 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the software application server 300 to carry out various functions in accordance with example embodiments of the present disclosure.

The processor 305 may be embodied in a number of different ways and may, for example, include one or more processing devices configured to perform independently. Additionally, or alternatively, the processor 305 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 305 may be configured to execute instructions stored in the memory 301 or otherwise accessible to the processor. Alternatively, or additionally, the processor 305 may be configured to execute hard-coded functionality. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

As just one example, the processor 305 may be configured to manage client write events received from client devices 130A, 130B, 130N (shown in FIG. 1) to provision user permissions for the native software application 310. The processor 305 ensures that user permissions provisioning access within the native software application 310 are properly stored and/or logged in a native database, such as any of databases 121, 123, or 125. In certain embodiments, the processor 305 provides client write events as a migration corpus for migration to the client event sequencing server 101 (shown in FIG. 1) via the event migration circuitry 320 discussed below.

In some embodiments, the software application server 300 may include input/output circuitry 330 that may, in turn, be in communication with processor 305 to provide output to the user and, in some embodiments, to receive an indication of a user input. The input/output circuitry 330 may comprise a user interface and may include a display and may comprise a web user interface, a mobile application, a client device, or the like. In some embodiments, the input/output circuitry 330 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

The communications circuitry 315 may be any means such as a device or circuitry embodied in either hardware or a combination of hardware and software that is configured to receive and/or transmit data from/to a network and/or any other device, circuitry, or module in communication with the software application server 300. In this regard, the communications circuitry 315 may include, for example, a network interface for enabling communications with a wired or wireless communication network. For example, the communications circuitry 315 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The event migration circuitry 320 may be any means such as a device or circuitry combined in either hardware or a combination of hardware and software that is configured to transmit client write events to the client event sequencing server 101 (shown in FIG. 1). For example, in some embodiments, the event migration circuitry 320 is configured to immediately transmit all client write events that are received from client devices to ensure that such client write events are received by the software application server 300 and the client event sequencing server 101 in parallel.

In other embodiments, the event migration circuitry 320 is configured to determine a migration corpus of client write events from its memory 301 (e.g., native databases 121, 123, 125) based on a copy operation request received from the client event sequencing server 101. In some embodiments, the copy operation request defines a copy period (e.g., the last eight hours) that the event migration circuitry 320 uses to identify the client write events that are to be included in the migration corpus (i.e., all client write events received by the software application server within the preceding eight hours). In other embodiments, the event migration circuitry 320 is simply configured to provide all client write events stored to a native database of the software application server in response to the copy operation request.

Example Client Device

FIG. 4 is an exemplary schematic diagram of a client device structured according to embodiments of the present disclosure. Client devices 130A, 130B, 130N (shown in FIG. 1) may be embodied by one or more computing devices, such as client device 400 depicted in FIG. 4. The depicted client device 400 includes a memory 401, a processor 405, communications circuitry 415, input/output ("I/O") circuitry 430, and one or more native software applications 410 comprising client event routing software 420. The client device 400 may be configured, using one or more of the circuitries 430, 415, or 420, to execute the operations described herein.

In some embodiments, the processor 405 (and/or co-processor or any other processing circuitry assisting or otherwise associated with the processor) may be in communication with the memory 401 via a bus for passing information among components of the client device 400. The memory 401 may be non-transitory and may include, for example, one or more volatile and/or non-volatile memories. In other words, for example, the memory 401 may be an electronic storage device (e.g., a computer readable storage medium). The memory 401 may be configured to store information, data, content, applications, instructions, or the like, for enabling the client device 400 to carry out various functions in accordance with example embodiments of the present disclosure.

The processor 405 may be embodied in a number of different ways and may, for example, include one or more processing devices configured to perform independently. Additionally, or alternatively, the processor 405 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 405 may be configured to execute instructions stored in the memory 401 or otherwise accessible to the processor. Alternatively, or additionally, the processor 405 may be configured to execute hard-coded functionality. As such, whether configured by hardware or software methods, or by a combination thereof, the processor 405 may represent an entity (i.e., physically embodied in circuitry) capable of performing operations according to an embodiment of the present disclosure while configured accordingly. Alternatively, as another example, when the processor 405 is embodied as an executor of software instructions, the instructions may specifically configure the processor 405 to perform the algorithms and/or operations described herein when the instructions are executed.

The communications circuitry 415 may be any means such as a device or circuitry embodied in either hardware or a combination of hardware and software that is configured to receive and/or transmit data from/to a network and/or any other device, circuitry, or module in communication with the client device 400. In this regard, the communications circuitry 415 may include, for example, a network interface for enabling communications with a wired or wireless communication network. For example, the communications circuitry 415 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some example embodiments where a client device 400 is a mobile device, such as a smartphone, tablet, or smartwatch, the client device 400 may execute a software application 410 such as client event routing software 420 supported by the federated database and platform to interact with network 105 (shown in FIG. 1). Such software applications 410 or "apps" are typically designed to execute on mobile devices, such as smartphones, tablets or smartwatches. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 400 may interact with the network 105 via a web browser. As yet another example, the client device 400 may include various hardware or firmware designed to interface with the network 105.

In the depicted embodiment, the client device 400 is configured, via the processor 405 and using data and instructions provided by the client event routing software 420, to provide client write events, via transmission over network 105, to client event sequencing server 101 and software application server(s) 115, 117, 119 (shown in FIG. 1) in parallel. In one embodiment, this parallel transmission is provided by the client event routing software 420 of the software application 410 transmitting all client write events to the client event sequencing server 101 and the software application server(s) 115, 117, 119 substantially simultaneously. In other embodiments, this parallel transmission is provided by the client event routing software 420 of the software application 410 transmitting all client write events only to the software application server(s) 115, 117, 119, which then are configured to immediately transmit such client write events to the client event sequencing server 101.

Example Data Flows of Embodiments of the Present Invention

FIG. 5A is a flowchart illustrating example operations for assigning back-date time stamps to the client write events of a migration corpus to support storing of other client write events in relation to the migration corpus in accordance with one embodiment of the present disclosure. As will be appreciated by one of ordinary skill in the art in view of this disclosure, the operations described below occur in the context of a client event sequencing server and at least one software application server receiving one or more client write events from various client devices in parallel.

In the embodiment illustrated in FIG. 5A, the depicted process 500 begins at Block 505, which includes receiving a migration corpus of client write events to the client event sequencing server from the at least one software application server. In some embodiments, the migration corpus is generated by the at least one software application server in response to receive a copy operation request issued by the client event sequencing server (not shown). In other embodiments, the migration corpus is generated by the at least one software application server based on a pre-defined copy operation schedule (not shown).

At Block 510, the depicted process 500 further includes assigning, by the client event sequencing server, a back-date time stamp to each client write event of the migration corpus. In various embodiments, as discussed above, the back-date time stamp is selected based on the copy operation initiation time ($t_0$) and the estimated network latency and/or device clock skew ($\alpha$). For example, the client event sequencing server may select a back-date time stamp of $t_0$ minus $\alpha$.

At Block 515, the depicted process 500 further includes receiving a new client write event associated with the software application to the client event sequencing server.

At Block 520, the depicted process 500 further includes assigning, by the client event sequencing server, a current time stamp to the new client write event.

At Block 525, the depicted process 500 further includes storing the new client write event to a client event sequencing database in relation to the migration corpus of client write events based at least in part on comparing the current time stamp assigned to the new client write event and the back-date time stamp assigned to each client write event of the migration corpus. The depicted process 500 may terminate at Block 525.

FIG. 5B is an example signal diagram illustrating data flow operations for assigning back-date time stamps to the client write events of a migration corpus to support storing and sequencing of newly received client write events in relation to the migration corpus in accordance with one embodiment of the present disclosure. The depicted signal diagram illustrates data flow operations occurring between client device 130N, software application server 115, client event sequencing server 101, and client event sequencing database 103 each of FIG. 1.

Returning to the example discussed in the Overview section above, admin user Stan issued an authorization event via his client device 130N granting Jeremy Jira® access. This authorization event is transmitted at operation 504 by the client event routing software 420 module of the software application 110A running on client device 130N in parallel to the Jira® application server 115 and the client event sequencing server 101. In the depicted embodiment, Stan's authorization event is transmitted at operation 504 to the Jira® application server 115. The event migration circuitry 320 of the Jira® application server 115 creates a duplicate copy of Stan's authorization event and then immediately transmits, at operation 504', the duplicate copy of Stan's authorization event to the client event sequencing server 101. Thus, the client event sequencing server 101 and the Jira® application server 115 both indicate that Jeremy has Jira® access when the client event sequencing server 101 goes offline at time $t_{offline}$.

During the offline period, Stan inadvertently issues a revocation event at operation 506 thereby revoking Jeremy's Jira® access. Although the revocation event is issued by client device 130N in parallel to both the Jira® application server 115 at operation 506, and the client event sequencing server 101 at operation 506', only the Jira® application server logs the revocation event as the client event sequencing server 101 is offline. Thus, in the depicted embodiment, the branch of transmission from Jira® application server 115 to the client event sequencing server 101 at operation 506' is shown in broken lines—indicating a transmission failure.

Once the client event sequencing server 101 comes online, it immediately begins to copy files from the Jira® software application server at time to in order to become current. In some embodiments, this copy operation is triggered by the client event sequencing server 101 issuing a copy operation request to the Jira® application server 115 (not shown). In other embodiments, this copy operation may be triggered by a regular database update schedule. In either case, a migration corpus of client write events is transmitted from the Jira® application server 115 to the client event sequencing server 101 at operation 508.

In the depicted embodiment, Stan tries to fix his revocation mistake by issuing another authorization event at time $t_0+2$ seconds at operation 510. This authorization event is issued a current time stamp associated with time $t_0+2$ seconds at operation 514. For example, if time $t_0+2$ seconds corresponded to Jan. 1, 2020 at 12:00:02 PM UTC, a time stamp of 1577880002 (a Unix equivalent time stamp) may be issued at operation 514.

As was noted above, the client event sequencing server 101 received at operation 508 a migration corpus of client write events. In the depicted embodiment, the migration corpus includes only client write events received or generated during the offline period for the client event sequencing server 101. However, in other embodiments, larger updates may be contemplated; even those which include all client write event data that might be stored to or accessible by the Jira® application server 115.

At operation 512, the client event sequencing server 101 assigns a back-date time stamp to each client write event included in the migration corpus. In this example, the client write event associated with Stan's correction of Jeremy's Jira® access occurred at time to +2 seconds and was given a time stamp of 1577880002 at operation 514. However, Stan's inadvertent revocation of Jeremy's Jira® access is logged among the migration corpus and must be given a time stamp during the copy operation. In the depicted embodiment, the client event sequencing server 101 (more precisely, the time stamp generation circuitry 220) assigns Stan's inadvertent revocation event a back-date time stamp of 1546344000 at operation 512, which corresponds to a back-date time period of to minus one year (i.e., one year prior to the time that the copy operation was initiated).

At operation 520, the client event sequencing server 101 compares the newly copied back-dated time stamps for its migration corpus to the near current time stamp associated with Stan's correction authorization event. More particularly, time stamp comparison circuitry 225 of the client event sequencing server 101 compares Stan's inadvertent revocation event to Stan's correction authorization event and determines that the correction event has a time stamp suggesting that it occurred later in time (i.e., 1577880002 is greater than 1546344000).

At operation 525, the client event sequencing server 101 stores the revocation event in the client event sequencing database 103 after properly sequencing this event relative to Stan's correction authorization event. Thus, the client event sequencing server 101 stores the new client write event in the client event sequencing database 103 in relation to the migration corpus in the sense that the client event sequencing database 103 logs the new client write event as occurring subsequent to any client write event in the migration corpus.

Additional Implementation Details

Although example processing systems have been described in FIGS. 1-5B, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "processor" or "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client computing device in response to requests received from the web browser.

Embodiments of the subject matter described herein can be implemented in a computing system that includes a back-end component, e.g., as an information/data server including a client event sequencing server, or that includes a middleware component, e.g., a software application server, or that includes a front-end component, e.g., a client computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a wireless communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method for sequencing client write events that are received in parallel from a client device to a client event sequencing server and at least one software application server that is configured to support a software application, the computer-implemented method comprising:
   receiving a migration corpus of client write events to the client event sequencing server from the at least one software application server;
   assigning, by the client event sequencing server, a back-date time stamp to each client write event of the migration corpus;
   receiving a new client write event associated with the software application to the client event sequencing server;
   assigning, by the client event sequencing server, a current time stamp to the new client write event; and
   storing the new client write event to a client event sequencing database in relation to the migration corpus of client write events based at least in part on comparing the current time stamp assigned to the new client write event and the back-date time stamp assigned to each client write event of the migration corpus.

2. The computer-implemented method of claim 1, wherein the client write events are received from the client device simultaneously to the client event sequencing server and the at least one software application server.

3. The computer-implemented method of claim 1, wherein the client write events are received from the client device to the at least one software application server, and the at least one software application server subsequently provides copies of the client write events to the client event sequencing server.

4. The computer-implemented method of claim 1, wherein the back-date time stamp designates one year prior to a copy operation start time determined by the client event sequencing server.

5. The computer-implemented method of claim 1, wherein the back-date time stamp designates six months prior to a copy operation start time determined by the client event sequencing server.

6. The computer-implemented method of claim 1, wherein the back-date time stamp is selected at a time ($\beta$) prior to a copy operation start time ($t_o$) minus any estimated network latency or device clock skew period ($\alpha$).

7. The computer implemented method of claim 6, wherein $\alpha$ ranges between 5 milliseconds and one year.

8. The computer-implemented method of claim 1, wherein the migration corpus embodies a collection of client write events that have been stored to the at least one software application server while the client event sequencing server was down or offline.

9. The computer-implemented method of claim 1, wherein the migration corpus embodies a collection of client write events that have been stored to the at least one software application server prior to activation of the client event sequencing server.

10. The computer-implemented method of claim 1, wherein the client write event is associated with an authorization event.

11. The computer-implemented method of claim 1, wherein, the client write is associated with a revocation event.

12. The computer-implemented method of claim 1, further comprising:
receiving a second migration corpus of client write events to the client event sequencing server from the at least one software application server; and
assigning, by the client event sequencing server, a second back-date time stamp to each client write event of the second migration corpus of client write events.

13. The computer-implemented method of claim 12, further comprising:
storing the new client write event to the client event sequencing database in relation to the migration corpus of client write events and the second migration corpus of client write events received from the at least one software application server based at least in part on comparing the current time stamp assigned to the new client write event, the back-date time stamp assigned to each client write event of the migration corpus, and the second back-date time stamp assigned to each client write event of the second migration corpus of client write events.

14. The computer-implemented method of claim 12, wherein the back-date time stamp is selected at a time ($\beta$) prior to a copy operation start time ($t_0$) minus any estimated network latency or device clock skew period ($\alpha$) and wherein the second back-date time stamp is selected at a time ($\beta'$) that is after the back-date time stamp ($\beta$) but prior to the copy operation start time ($t_0$) minus the estimated network latency or device clock skew period ($\alpha$).

15. An apparatus for sequencing client write events that are received in parallel from a client device to a client event sequencing server and at least one software application server that is configured to support a software application, the apparatus comprising at least a processor, and a memory associated with the processor having computer coded instructions therein, with the computer coded instructions configured to, when executed by the processor cause the apparatus to:
receive a migration corpus of client write events to the client event sequencing server from the at least one software application server;
assign, by the client event sequencing server, a back-date time stamp to each client write event of the migration corpus;
receive a new client write event associated with the software application to the client event sequencing server;
assign, by the client event sequencing server, a current time stamp to the new client write event; and
store the new client write event to a client event sequencing database in relation to the migration corpus of client write events based at least in part on comparing the current time stamp assigned to the new client write event and the back-date time stamp assigned to each client write event of the migration corpus.

16. The apparatus of claim 15, wherein the client write events are received from the client device simultaneously to the client event sequencing server and the at least one software application server.

17. The apparatus of claim 15, wherein the client write events are received from the client device to the at least one software application server, and the at least one software application server subsequently provides copies of the client write events to the client event sequencing server.

18. The apparatus of claim 15, wherein the back-date time stamp designates one year prior to a copy operation start time determined by the client event sequencing server.

19. The apparatus of claim 15, wherein the back-date time stamp designates six months prior to a copy operation start time determined by the client event sequencing server.

20. The apparatus of claim 15, wherein the back-date time stamp is selected at a time ($\beta$) prior to a copy operation start time ($t_0$) minus any estimated network latency or device clock skew period ($\alpha$).

21. The apparatus of claim 20, wherein $\alpha$ ranges between 5 milliseconds and one year.

22. The apparatus of claim 15, wherein the migration corpus embodies a collection of client write events that have been stored to the at least one software application server while the client event sequencing server was down or offline.

23. The apparatus of claim 15, wherein the migration corpus embodies a collection of client write events that have been stored to the at least one software application server prior to activation of the client event sequencing server.

24. The apparatus of claim 15, wherein the client write event is associated with an authorization event.

25. The apparatus of claim 15, wherein the client write event is associated with a revocation event.

26. The apparatus of claim 15, wherein the computer coded instructions are further configured to, when executed by the processor, further cause the apparatus to:
receive a second migration corpus of client write events to the client event sequencing server from the at least one software application server; and
assign, by the client event sequencing server, a second back-date time stamp to each client write event of the second migration corpus.

27. The apparatus of claim 26, wherein the computer coded instructions are further configured to, when executed by the processor, further cause the apparatus to: store the new client write event to the client event sequencing database in relation to the migration corpus of client write events and the second migration corpus of client write events received from the at least one software application server based at least in part on comparing the current time stamp assigned to the new client write event, the back-date time stamp assigned to each client write event of the migration corpus, and the second back-date time stamp assigned to each client write event of the second migration corpus.

28. The apparatus of claim 26, wherein the back-date time stamp is selected at a time ($\beta$) prior to a copy operation start time ($t_0$) minus any estimated network latency or device clock skew period ($\alpha$) and wherein the second back-date time stamp is selected at a time ($\beta'$) that is after the back-date time stamp ($\beta$) but prior to the copy operation start time ($t_0$) minus the estimated network latency or device clock skew period ($\alpha$).

29. A computer program product for sequencing client write events that are received in parallel from a client device to a client event sequencing server and at least one software application server that is configured to support a software application, the computer program product comprising at least one non-transitory computer-readable storage medium having computer-executable program code instructions stored therein, the computer-executable program code instructions comprising code instructions to:
- receive a migration corpus of client write events to the client event sequencing server from the at least one software application server;
- assign, by the client event sequencing server, a back-date time stamp to each client write event of the migration corpus;
- receive a new client write event associated with the software application to the client event sequencing server;
- assign, by the client event sequencing server, a current time stamp to the new client write event; and
- store the new client write event to a client event sequencing database in relation to the migration corpus of client write events based at least in part on comparing the current time stamp assigned to the new client write event and the back-date time stamp assigned to each client write event of the migration corpus.

* * * * *